United States Patent
Kyowski

(10) Patent No.: US 9,880,685 B2
(45) Date of Patent: Jan. 30, 2018

(54) PORTABLE ELECTRONIC DEVICE INCLUDING KEYBOARD AND METHOD OF CONTROLLING SAME

(71) Applicant: BLACKBERRY LIMITED, Waterloo (CA)

(72) Inventor: Timothy Herbert Kyowski, Kitchener (CA)

(73) Assignee: BlackBerry Limited, Waterloo (CA)

( * ) Notice: Subject to any disclaimer, the term of this patent is extended or adjusted under 35 U.S.C. 154(b) by 72 days.

(21) Appl. No.: 14/855,124

(22) Filed: Sep. 15, 2015

(65) Prior Publication Data

US 2017/0075445 A1    Mar. 16, 2017

(51) Int. Cl.
| | |
|---|---|
| *G09G 5/00* | (2006.01) |
| *G06F 3/044* | (2006.01) |
| *G06F 3/041* | (2006.01) |
| *G06F 3/02* | (2006.01) |

(52) U.S. Cl.
CPC ............ *G06F 3/044* (2013.01); *G06F 3/0202* (2013.01); *G06F 3/0227* (2013.01); *G06F 3/0412* (2013.01); *G06F 2203/04102* (2013.01); *G06F 2203/04104* (2013.01)

(58) Field of Classification Search
CPC ........ G06F 1/1624; G06F 1/1662; G06F 3/02; G06F 3/0238; H01H 13/70; H03K 17/94
USPC ................... 345/168; 200/521, 514; 335/205
See application file for complete search history.

(56) References Cited

U.S. PATENT DOCUMENTS

| | | | | |
|---|---|---|---|---|
| 3,588,766 | A * | 6/1971 | Baermann | H01H 36/0073 178/17 C |
| 6,497,521 | B1 | 12/2002 | Lohr | |
| 2008/0278354 | A1* | 11/2008 | Garrett | G06F 3/0202 341/32 |
| 2012/0242592 | A1* | 9/2012 | Rothkopf | G06F 1/1652 345/173 |
| 2013/0154942 | A1 | 6/2013 | Okada | |
| 2014/0379325 | A1* | 12/2014 | Houache | G06F 3/0237 704/9 |

OTHER PUBLICATIONS

Extended European Search Report dated Dec. 13, 2016 issued on the corresponding European application No. 16186831.0.

(Continued)

*Primary Examiner* — Jennifer Nguyen
(74) *Attorney, Agent, or Firm* — Borden Ladner Gervais LLP; Geoffrey deKleine

(57) ABSTRACT

An electronic device includes a plurality of keycaps, first magnets disposed on an underside of the keycaps, each first magnet of the plurality of first magnets being associated with a respective one of the keycaps and moveable therewith relative to the back of the device, and electromagnets disposed between the back of the keyboard and the first magnets, each electromagnet being associated with a respective one of the first magnets and a respective one of the keycaps. The electronic device also includes a controller coupled to the electromagnets to control each electromagnet to maintain a magnetic field to repel the first magnet and to reverse the polarity in response to detecting an external applied force on the keycap that meets a threshold value to facilitate movement of the respective keycap from a first position, toward the back of the keyboard, to a second position.

20 Claims, 4 Drawing Sheets

(56) References Cited

OTHER PUBLICATIONS

Grégory Savioz, "Multi-Finger Haptic Devices Integrating Miniature Short-Stroke Actuators", Thèse No. 5485 (2012), pp. 93-94, 141-154 and 194, presented at École Polytechnique Fédérale de Lausanne, Sep. 28, 2012.

\* cited by examiner

PORTABLE ELECTRONIC DEVICE INCLUDING KEYBOARD AND METHOD OF CONTROLLING SAME

FIELD OF TECHNOLOGY

The present disclosure relates to portable electronic devices including touch-sensitive displays.

BACKGROUND

Portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs or smart telephones are generally intended for handheld use and ease of portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in portable electronic devices are desirable.

BRIEF DESCRIPTION OF THE DRAWINGS

Embodiments of the present disclosure will now be described, by way of example only, with reference to the attached figures, in which.

DETAILED DESCRIPTION

Figure 1:
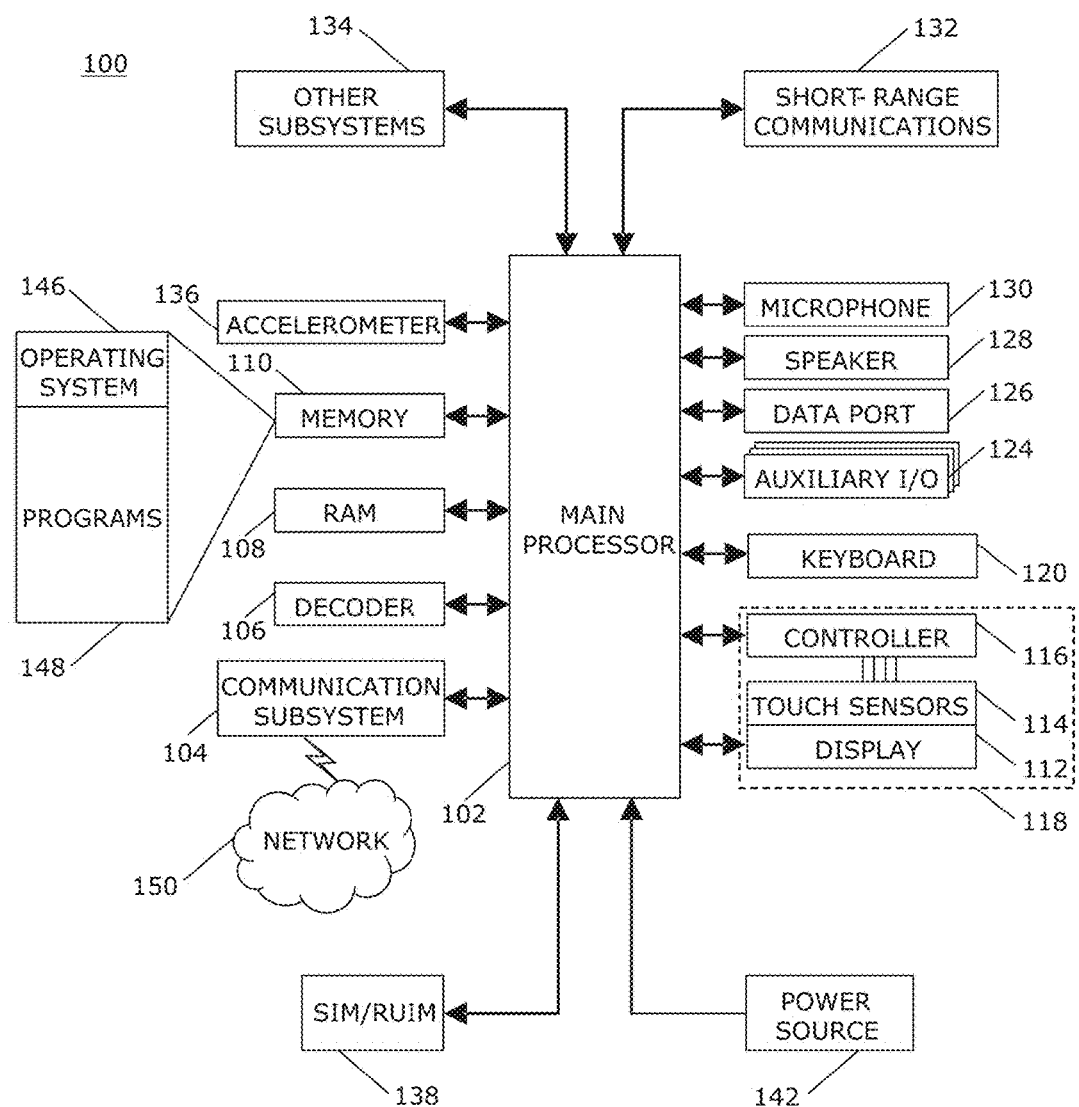
FIG. 1 is a block diagram of a portable electronic device in accordance with the present disclosure.

An electronic device includes a plurality of keycaps, first magnets disposed on an underside of the keycaps, between the keycaps and a back of the electronic device, each first magnet of the plurality of first magnets being associated with a respective one of the keycaps and moveable therewith relative to the back of the device, and electromagnets disposed between the back of the keyboard and the first magnets, each electromagnet being associated with a respective one of the first magnets and a respective one of the keycaps. The electronic device also includes a controller coupled to the electromagnets to control each electromagnet to maintain a magnetic field to repel the first magnet and to reverse the polarity in response to detecting an external applied force on the keycap that meets a threshold value to facilitate movement of the respective keycap from a first position, toward the back of the keyboard, to a second position.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a keyboard or a portable electronic device including a keyboard, as described herein. Examples of portable electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of generally transparent keycaps and a flexible display disposed under the keycaps for displaying characters such as alphabetical characters, numeric characters, punctuation, or symbols. The keyboard 120 is further described herein below.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
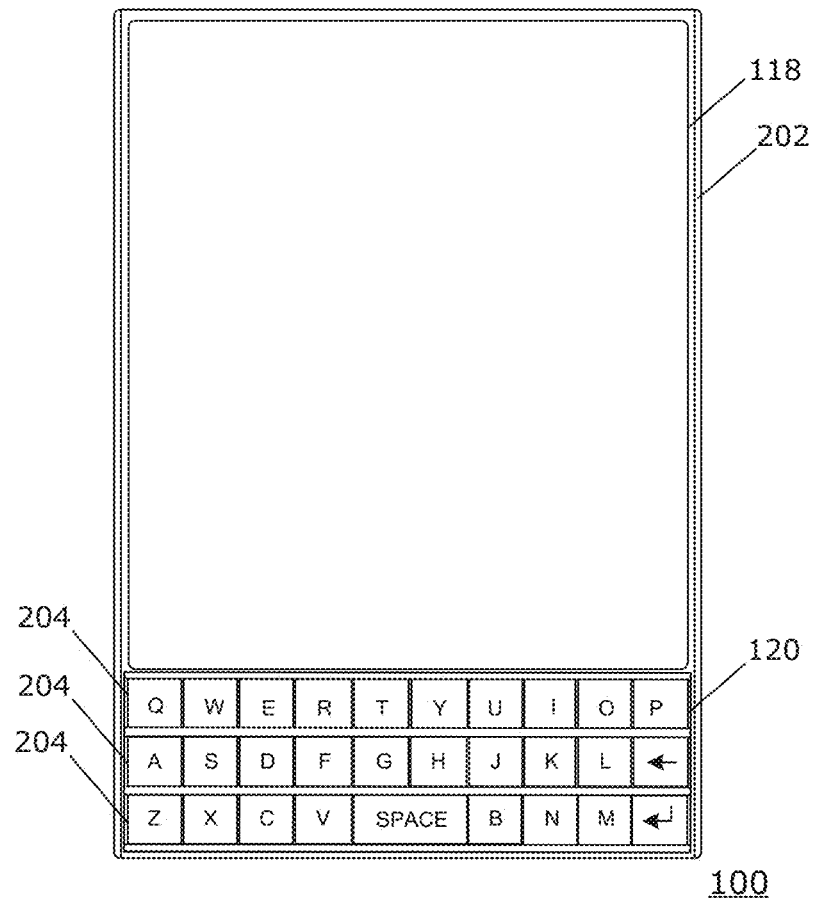
FIG. 2 is a front view of an example of a portable electronic device in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is adjacent to the touch-sensitive display 118 in the example illustrated in FIG. 2. The keyboard 120 includes a plurality of keycaps 204. All or a portion of each keycap may be generally transparent. A flexible display may be disposed under the keycaps 204 for displaying the alphabetical characters, which are visible through the keycaps 204, as illustrated in FIG. 2.

Figure 3:
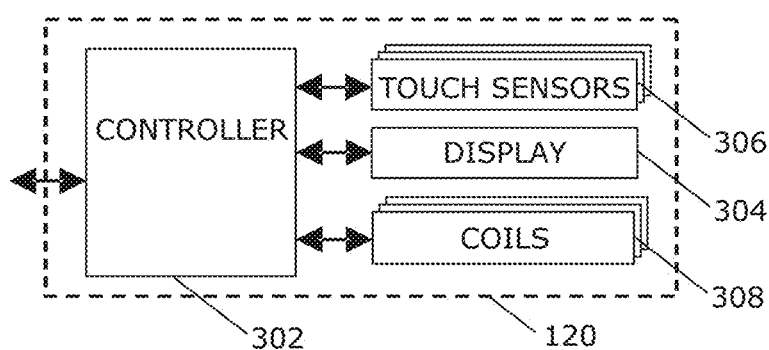
FIG. 3 is a block diagram of an example of a keyboard in accordance with the present disclosure.

A block diagram of an example of the keyboard 120 is shown in FIG. 3. In this example, the keyboard 120 includes a keyboard controller 302 that is coupled to and in communication with the processor 102 that controls the overall operation of the electronic device 100. The controller 302 may include software executed by the controller 302 and stored in a local, persistent, updatable store.

The controller 302 interacts with other components, such as the flexible display 304 and keyboard touch sensors 306 that are utilized to detect touches on the keyboard 120. The controller 302 is also coupled to electromagnets that include coils 308 that are associated with the keycaps 204 (shown in FIG. 2) and are utilized to control a magnetic field associated with each of the keycaps 204 (shown in FIG. 2).

A flexible display 304, which may be an organic light-emitting diode (OLED) display, is utilized to display characters, symbols, images, or other information that is visible through the keycaps 204 (shown in FIG. 2) of the keyboard 120. The keyboard touch sensors 306 include a plurality of capacitive touch sensors disposed on the surface of the flexible display 304 that is closest to the keycaps 204 (shown in FIG. 2). Thus, the keyboard touch sensors 306 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material for detecting touches and through which light may be transmitted, such as indium tin oxide (ITO).

One or more touches, also known as touch contacts or touch events, may be detected by the keyboard touch sensors 306. The controller 302 may determine attributes of the touch, including a location of the touch. By repeatedly scanning the keyboard touch sensors 306 to detect touches, movement of a touch relative to the keyboard 120 may be detected. One or more gestures may also be detected by the keyboard 120.

The coils 308 are controlled by the controller 302 and are each utilized to create a magnetic field by passing electric current through the coil 308. The magnetic field may be utilized to create a magnetic field, for example, by polarizing a core in the center of each of the coils 308 and to reverse the magnetic field. Thus, each coil 308 and core form part of an electromagnet that is utilized in the keyboard 120.

Figure 4:
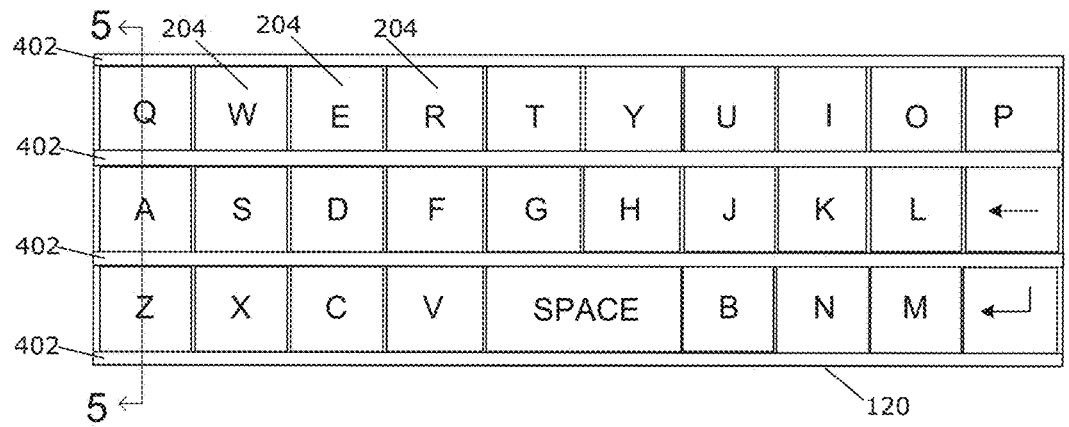
FIG. 4 is a front view of an example of a keyboard in accordance with the disclosure.

FIG. 4 illustrates an example of a keyboard in accordance with the disclosure, such as the keyboard 120 shown in FIG. 2. The keyboard 120 illustrated in FIG. 4 is drawn to a larger scale. In this example, the flexible display 304 displays the characters of a QWERTY keyboard under the keycaps 204 such that a single character is displayed under each keycap 204. The keycaps 204 illustrated in FIG. 4 are grouped in rows such that each row is spaced from an adjacent row by a fret 402 and each keycap 204 in a row is adjacent to another keycap 204 in the same row, without an intervening fret. Four frets 402, including a fret above the top row of keycaps 204 and a fret below the bottom row of keycaps 204 are shown in the example of FIG. 4. Alternatively, each keycap may be surrounded on all sides by frets 402 or the keycaps may be grouped in columns such that each column is spaced from an adjacent column by a fret and each keycap 204 in a column may be adjacent to another keycap 204 in the same column, without an intervening fret.

The frets 402 may be comprised of, for example, plastic and may be transparent such that information displayed on the flexible display 304 is visible through the frets 402. Thus, information, such as additional characters, words, phrases, or other information may be visible through the frets 402 and may be selectable, for example, by a gesture on the keyboard 120.

Figure 5:
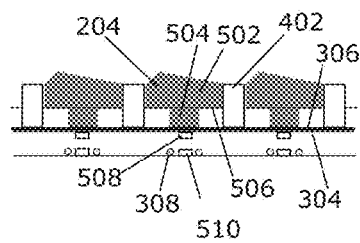
FIG. 5 through 7 illustrate examples of sectional views of the keys, along the line 5-5 of FIG. 4.

FIG. 5 illustrates a sectional view of the keys, along the line 5-5 of FIG. 4. As illustrated, each keycap 204 is generally centered between two frets 402. Each keycap 204 includes a top 502, which is the portion of the keycap 204 that is contacted when a touch occurs, for example, to select a character. Each keycap 204 also includes a post 504 extending from the top 502, toward a back of the keyboard, which in the example of FIG. 2 is the back of the electronic device.

Each keycap 204 is supported by a membrane 506 that is coupled to the frets 402 and extends under the top 502 of the keycap 204, with the post 504 extending through an aperture in the membrane 506, toward the back of the electronic device. The membrane 506 is a resiliently flexible membrane to facilitate movement of the keycap 204 from the first position shown in FIG. 5 in which an external force is not applied to the keycap 204, to the second, depressed position, as illustrated by the center keycap in FIG. 6, in response to an externally applied force. The resilience of the membrane 506 facilitates return of the keycap from the second, depressed position, to the first position in response to removal of the externally applied force. The resilient membrane 506 therefore biases the keycap 204 to the first position.

The flexible display 304 is disposed on an underside of the plurality of keycaps 204, between the keycaps 204 and the back of the electronic device. In this example, the keyboard touch sensors 306 are disposed on the flexible display 304, between the flexible display 304 and the posts 504 of the keycaps 204, to detect touches on the keycaps 204. As indicated above, the keycaps 204 are generally transparent. The flexible display 304 is oriented such that information displayed on the flexible display 304 is visible through the generally transparent keycaps 204. The keycaps 204 do not include characters that are printed or stenciled or otherwise permanently marked thereon. Rather, the characters that are associated with the keycaps 204 are displayed on the flexible display 304 and are visible through the keycaps 204.

Because the characters associated with each keycap are displayed on the flexible display 304, the characters may be changed. For example, the characters displayed may be dependent on the active application running on the electronic device 100. The keyboard 120 may display numerical characters or may display punctuation or arrows or other symbols for controls, for example, when a game is the active application running on the portable electronic device 100.

When the keyboard 120 is in use and an external force is not applied to any of the keycaps 204, i.e., a user is not pressing on a key, the flexible display 304 generally lies flat, in a plane, as illustrated in FIG. 5. Thus, information that is displayed on the flexible display 304 and under the keycaps 204 is not distorted and is readily visible and discernible through the keycaps 204.

Each keycap 204 is associated with a respective first magnet 508 that is disposed between the flexible display 304 and the back of the electronic device and is coupled to the flexible display 304. Each first magnet 508 associated with a respective keycap 204 is coupled to the flexible display 304 at a location that is generally centered under the post 504 of the respective keycap 204. Because, for each keycap 204, the respective first magnet 508 is coupled to the flexible display 304, under the post 504 of the keycap 204, movement of the keycap 204 from the first position shown in FIG. 5, to the second, depressed position, shown by the middle keycap 204 in FIG. 6, causes flexing or bending of the flexible display 304 such that a portion of the flexible display 304 and the associated first magnet 508 move toward the back of the electronic device. The first magnet 508 may be a permanent magnet that is coupled to the flexible display 304, for example, by adhering the first magnet 508 to a backside of the flexible display 304.

Each keycap 204 is also associated with a respective electromagnet that includes the coil 308 and a core 510. Each core 510 is disposed on a base 512, which may be, for example, a printed circuit board. The cores 510 are fixed to the base 512 such that each core 510 is generally aligned with a respective first magnet 508. When an external applied force on a keycap 204 is sufficient to cause the keycap 204 to move from the first position shown in FIG. 5, to the second, depressed position, shown by the middle keycap 204 in FIG. 6, the associated first magnet 508 moves toward the associated core 510. In the examples illustrated in FIG. 5 and FIG. 6, the first magnet 508 is in contact with or is very close to contacting the core 510 when the keycap 204 is in the second, depressed position. Alternatively, a flexible spacer that is depressible may be disposed between the first magnet 508 and the core 510 to inhibit contact between the two, and to cushion the collapse of the keycap 204 from the first position to the second, depressed position. The core 510 may be comprised of one or more of, for example, iron, nickel, and cobalt to facilitate magnetization of the core 510.

Each of the coils 308 is fixed to the base 512 and is coiled around a respective core 510. Each coil may be comprised of, for example, copper or other conductive material to generate a magnetic field by passing electric current through the coil 308. The magnetic field may be utilized to polarize the core 510 in the center of each of the coils 308 and to reverse the polarity of the core 510 in the center of each of the coils 308. The polarity is reversed by passing electric current in the opposite direction through the coil 308. By controlling the polarity of each core 510, the controller 302 (shown in FIG. 3) controls whether the first magnet 508 is attracted to or repelled by the core 510.

The coils 308 are also utilized to detect changes to a magnetic field by detecting or determining a change in the signal received at the keyboard controller 302 from the respective coil. When an external force is applied to a keycap 204, i.e., a user presses on the keycap 204, to enter a character, the distance between the associated first magnet 508 and the associated core 510 changes as the first magnet 508 is moved toward the electromagnet. The first magnet 508 thus interferes with and changes the magnetic field near the associated coil 308. The change in magnetic field is measurable as a change in current through the coil, which results in a signal from the coil 308 to the controller 302. Thus, the coil 308 is utilized to magnetize the core 510, reverse the polarity of the core 510, and to measure a quantity or value indicative of the externally applied force on the keycap 204.

Figure 6:
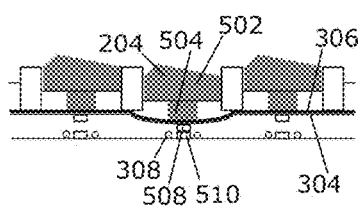
Figure 7:
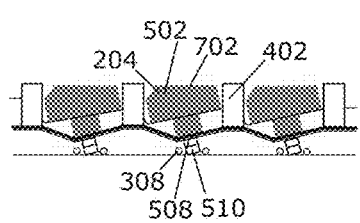

In the example illustrated in FIG. 5 and FIG. 6, the keycap 204 moves generally at a right angle to the base 512 when the keycap 204 moves from the first position to the second, depressed position. Alternatively, the keycap 204 may move at some other angle relative to the base 512. In the example illustrated in FIG. 7, the keycap 204 moves toward the base 512 and at an acute angle thereto such that a majority of the outer surface 702 of the keycap 204 is flush with and lies in the same plane as the frets 402. In this example, the core 510 is mounted on the base 512 such that the upper surface of the core 510 is forms an acute angle with the base 512. When the keycap 204 is moved to the second position, the first magnet 508 is moved downwardly and at a similar angle, to thereby match the angle and lie flat against the core 510, causing an angular movement from the first position to the second, depressed position.

Thus, the movement of keycaps 204 that are shaped to facilitate typing utilizing very small keys, may be controlled such that at least a portion of the outer surface 702 of the keycaps 204 lie flush with the frets 402. Thus, when keycaps 204 are not utilized for selection of characters, the keycaps 204 can be maintained in the second position with the majority of the outer surface of the keycaps 204 that are not utilized lying flush with the frets 402. The keycaps 204 may be locked in this position in that depression of the keycaps 204 is inhibited. This locking out of keys or inhibiting depression facilitates use of the keycaps as a scrolling pad, for example, in which the keycaps 204 are not depressible but are utilized for receiving gestures that are detected by the keyboard touch sensors 306.

Figure 8:
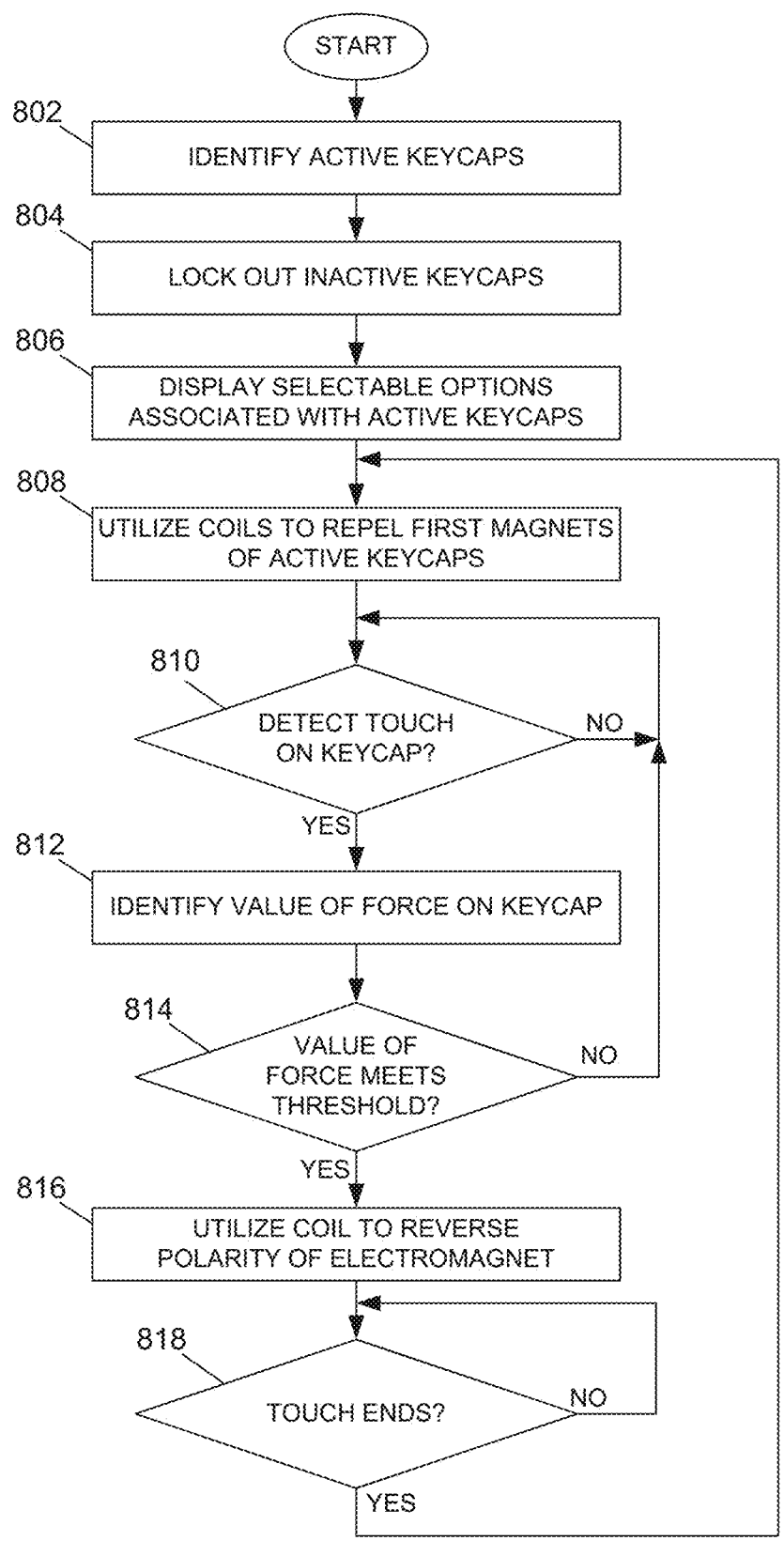
FIG. 8 is a flowchart illustrating a method of control of selection of information in accordance with the present disclosure.

A flowchart illustrating a method of controlling a keyboard of an electronic device is shown in FIG. 8. The method may be carried out by software executed, for example, by the keyboard controller 302, the processor 102 or a combination thereof. Coding of software for carrying out such a method is within the scope of a person of ordinary skill in the art given the present description. The method may contain additional or fewer processes than shown and/or described, and may be performed in a different order. Computer-readable code executable by at least one controller 302 or processor 102 of the portable electronic device 100 to perform the method may be stored in a computer-readable storage medium, such as a non-transitory computer-readable medium.

Active and inactive keycaps 204 are identified at 802. The active keycaps 204 are keys that are utilized on the keyboard 120. Keycaps 204 that are inactive are those keys that are not utilized at that time. For example, when the portable electronic device 100 is utilized for typing and the alphabetical characters are displayed on the flexible display 304 in a QWERTY keyboard layout, all the keys of the keyboard are active and each key may be depressed to enter an associated character or function, such as a return or enter function. When the portable electronic device 100 is utilized as a game controller, fewer keycaps 204 may be utilized. For example, only four keycaps 204 may be utilized to enter information. The four keycaps 204 may be associated with four arrows in four directions and the remaining keycaps 204 may be inactive such that these remaining keys cannot be utilized as input. The keycaps 204 that are active is dependent on the active application running on the portable electronic device 100. Thus, all keycaps 204 may be active in a word processing application during entry of characters. Some of the keycaps 204 may be inactive, however, when a game is executed by the processor 102.

The keycaps 204 that are identified as inactive at 802 are locked out at 804. The keycaps 204 that are identified at 802 are locked out by controlling the respective coil 308, for example, to create a magnetic field for each of the inactive keycaps 802 to repel the respective first magnet 508. For example, the coil may be utilized to create a magnetic field for an inactive keycap to inhibit the keycap 204 from being depressed completely. Alternatively, the keycaps 204 may be locked out by controlling the respective coil 308 for each of the inactive keycaps 802 to attract the respective first magnet 508. Thus, a magnetic field is maintained to maintain the keycap 204 in the second position.

Selectable options are displayed on the flexible display 306 at locations associated with the active keycaps 204 at 806. The selectable options that are displayed are visible through the keycaps 204 that are active. No selectable options are visible through the keycaps 204 that are inactive. Optionally, other information may be displayed on the flexible display 304 such that the other information is visible through the keycaps 204 that are inactive. The selectable options may be characters such as alphabetical characters, numeric characters, or punctuation or symbols for input. Optionally, additional information may also be displayed on the flexible display 304 at locations that correspond to the frets 402. The additional information may include, for example, additional characters, words, phrases, or other information and may be selectable, for example, by a gesture on the keyboard 120, in the direction of the additional information. The selectable options may also be symbols such as arrows in the example of use of the keyboard 120 as a game controller.

The coils 308 are utilized to create a magnetic field to repel the respective first magnets 508 at 808. Thus, the polarity of the electromagnets of each active keycap is maintained to provide a resistance to depression of the keycaps 204 that are active.

In response to detecting a touch on a keycap 204 at 810, the process continues at 812. A touch on a keycap 204 is detected by the keyboard touch sensors 306 that are disposed on the flexible display 304.

A value of an external applied force, i.e., a user-applied force, on the keycap 204 at which the touch is detected at 810, is identified at 812. As described above, a force applied to the keycap 204 moves the first magnet 508 toward the core 510, causing a change in the magnetic field and changing current in the coil 308, which is identified and quantified. The value is representative of the force applied such that a greater force results in a greater value.

The value of the applied force is compared to a threshold value at 814 and in response to determining that the value of the applied force meets the threshold value, the process continues to 816. The value of the applied force meets the threshold when the value is equal to or exceeds the threshold value 814.

The coil 308 associated with the keycap 204 at which the touch is detected and on which the force is applied, is the utilized to reverse the polarity of the electromagnet such that first magnet 508 is attracted to the electromagnet. With the polarity reversed, and the attraction of the first magnet 508 to the electromagnet, the keycap 204 moves toward the base 512, providing the tactile feedback of a button collapsing when depressed.

The keyboard touch sensors 306 are continually utilized to detect touches on the keycaps 204, including the keycap 204 at which the touch is detected. The keyboard touch sensors 306 are utilized to identify when a touch ends by identifying that a touch that is detected in one scan of the keyboard touch sensors 306 is not detected in a subsequent scan of the keyboard touch sensors 306. In response to determining that the touch ends at 818, the process returns to 808 and the coils are utilized to create a magnetic field of the electromagnets to repel the respective first magnets 508 at 808. The magnetic field created by the electromagnet of each active keycap 204 again results in resistance to depression of the keycaps 204 that are active.

In the above-described embodiments, the electromagnets each include a coil and a core. Optionally, the core may be a permanent magnet such that the core is polarized. The polarity of the electromagnet in this case may be maintained simply by not inducing a current through the coil. The polarity of the electromagnet may be reduced by utilizing the coil to reverse the overall polarity of the electromagnet to attract or repel the first magnet. Alternatively, the electromagnet may not include a core such that the coil is operable to cause movement of the first magnet relative to the coil. Optionally, the coil and the first magnet may cooperate to act as a solenoid.

Advantageously, the characters displayed on the flexible display 304 may vary such that the characters may be altered depending on the application. Alphabetical characters may be displayed for character entry in an alphabetical keyboard layout and, in response to, for example, a user selecting a numerical keyboard option, numbers may be displayed in a numerical keyboard layout. Further, other symbols may be displayed. Keycaps may also be locked out when not in use. In addition, all of the keycaps may be locked out, or inhibited from being depressed to utilize the keycaps as a scrolling pad, also referred to as a mouse pad, for example.

The scope of the claims should not be limited by the preferred embodiments set forth in the examples, but should be given the broadest interpretation consistent with the description as a whole.

What is claimed is:

1. A keyboard comprising:
   a plurality of keycaps moveable relative to a back of the keyboard;
   first magnets disposed on an underside of the keycaps, each first magnet of the plurality of first magnets being associated with a respective one of the keycaps and moveable therewith relative to the back of the keyboard;
   electromagnets disposed between the back of the keyboard and the first magnets, each electromagnet being associated with a respective one of the first magnets and a respective one of the keycaps;
   a controller coupled to the electromagnets and configured to control each electromagnet to maintain a magnetic field to repel the first magnet, and to reverse polarity of the electromagnet in response to detecting an external applied force on the keycap that meets a threshold value to facilitate movement of the respective keycap from a first position, toward the back of the keyboard, to a second position.

2. The keyboard according to claim 1, wherein the electromagnets each comprises a coil and a core disposed in the coil.

3. The keyboard according to claim 1, wherein the electromagnets each comprise a coil and a permanent magnet disposed in the coil.

4. The keyboard according to claim 1, wherein the electromagnet comprises a solenoid for cooperating with the first magnet.

5. The keyboard according to claim 1, comprising flexible spacers, each of the flexible spacers cooperating with a respective keycap to maintain the keycap in the first position in the absence of any external applied force and compressible to facilitate movement of the keycap toward the electromagnet in response to detecting the external applied force on the keycap that meets the threshold value.

6. The keyboard according to claim 1, comprising capacitive touch sensors disposed on the keycaps to detect a touch on the keycaps and to identify a location of the touch.

7. The keyboard according to claim 1, at least a portion of the keycaps are transparent and the keyboard further comprises a flexible display disposed on an underside of the plurality of keycaps, between the plurality of keys and back of the keyboard.

8. The keyboard according to claim 7, wherein the flexible display comprises an organic light-emitting diode display.

9. The keyboard according to claim 7, comprising frets extending between the keycaps and wherein the frets are transparent such that information displayed on the flexible display is visible through the frets.

10. The keyboard according to claim 7, wherein the flexible display is flexed when one of the keycaps moves from the first position to the second position.

11. A portable electronic device comprising:
    a first display;
    a keyboard proximal the first display, the keyboard comprising:
    a plurality of keycaps;
    first magnets disposed on an underside of the keycaps, each first magnet of the plurality of first magnets being associated with a respective one of the keycaps and moveable therewith relative to a back of the keyboard;

electromagnets disposed between the back of the keyboard and the first magnets, each electromagnet being associated with a respective one of the first magnets and a respective one of the keycaps;

a controller coupled to the electromagnets and configured to control each electromagnet to maintain a magnetic field to repel the first magnet, and to reverse polarity of the electromagnet in response to detecting an external applied force on the keycap that meets a threshold value to facilitate movement of the respective keycap from a first position, toward the back of the keyboard, to a second position.

12. The portable electronic device according to claim 11, wherein at least a portion of the keycaps is transparent and the portable electronic device further comprises a second display disposed on an underside of the plurality of keycaps, between the plurality of keys and back of the keyboard, the second display being flexible.

13. A method of controlling an electronic device comprising a keyboard that includes a plurality of keycaps, first magnets disposed on an underside of the keycaps, each first magnet of the plurality of first magnets being associated with a respective one of the keycaps and moveable therewith relative to the back of the keyboard, electromagnets disposed between the back of the keyboard and the first magnets, each electromagnet being associated with a respective one of the first magnets and a respective one of the keycaps, and a controller coupled to the electromagnets to control each electromagnet, the method comprising:

based on signals received at the controller from one of the electromagnets, determining a value of an external applied force on the respective one of the keycaps;

in response to determining that the value of the external applied force meets a threshold value, controlling the one of the electromagnets to reverse a polarity of the respective electromagnet to facilitate movement of the respective first magnet toward the respective electromagnet, and thereby facilitate movement of the respective keycap from a first position, toward the back of the keyboard, to a second position.

14. The method according to claim 13, wherein the electronic device includes a flexible display disposed on an underside of the keycaps, between the keycaps and the first magnets, and touch sensors disposed on the flexible display, wherein the method comprises detecting, by the controller, a touch on the one of the keycaps based on signals from the touch sensors.

15. The method according to claim 14, comprising detecting an end of the touch when the respective keycap is in the second position and controlling the one of the electromagnets to reverse the polarity of the respective electromagnet to return the respective keycap to the first position.

16. The method according to claim 13, comprising identifying a keycap, of the plurality of keycaps, as inactive.

17. The method according to claim 16, wherein the keycap is identified as inactive based on an active application of the electronic device.

18. The method according to claim 16, comprising maintaining the keycap in the first position in response to identifying that the keycap is inactive.

19. The method according to claim 16, comprising maintaining the keycap in the second position in response to identifying that the keycap is inactive.

20. A non-transitory computer-readable medium having computer-readable code stored thereon, the computer-readable code executable by at least one processor of a portable electronic device to perform the method according to claim 13.

* * * * *